United States Patent
Tanno

(10) Patent No.: US 10,286,737 B2
(45) Date of Patent: May 14, 2019

(54) PNEUMATIC TIRE

(71) Applicant: The Yokohama Rubber Co., LTD., Minato-ku, Tokyo (JP)

(72) Inventor: Atsushi Tanno, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 99 days.

(21) Appl. No.: 15/038,331

(22) PCT Filed: Nov. 21, 2014

(86) PCT No.: PCT/JP2014/080947
§ 371 (c)(1),
(2) Date: May 20, 2016

(87) PCT Pub. No.: WO2015/076381
PCT Pub. Date: May 28, 2015

(65) Prior Publication Data
US 2016/0288587 A1    Oct. 6, 2016

(30) Foreign Application Priority Data

Nov. 21, 2013    (JP) ................................. 2013-241358

(51) Int. Cl.
*B60C 19/00*    (2006.01)
*B60C 23/04*    (2006.01)
(Continued)

(52) U.S. Cl.
CPC ............. *B60C 19/002* (2013.01); *B60C 1/00* (2013.01); *B60C 11/00* (2013.01); *B60C 13/00* (2013.01);
(Continued)

(58) Field of Classification Search
CPC ......... B60C 11/00; B60C 13/00; B60C 15/00; B60C 19/002; B60C 1/00; B60C 23/04; B60C 23/0493; B60C 5/00; B60C 19/00
(Continued)

(56) References Cited

U.S. PATENT DOCUMENTS

2005/0098251 A1    5/2005  Yukawa
2005/0155686 A1    7/2005  Yukawa et al.
(Continued)

FOREIGN PATENT DOCUMENTS

JP    2002-067608        3/2002
JP    2003063208 A  *   3/2003  ........... B60C 19/002
(Continued)

OTHER PUBLICATIONS

JP2003063208A_Machine Translation (Year: 2003).*
International Search Report for International Application No. PCT/JP2014/080947 dated Feb. 17, 2015, 4 pages, Japan.

*Primary Examiner* — Matthew J Daniels
*Assistant Examiner* — Yunju Kim
(74) *Attorney, Agent, or Firm* — Thorpe North & Western

(57) ABSTRACT

A pneumatic tire of the present technology includes a tread portion, sidewall portions, bead portions, and a belt-shaped sound-absorbing member bonded to a region on a tire inner surface corresponding to the tread portion along the tire circumferential direction with an adhesive layer disposed between the tire inner surface and the sound-absorbing member. In such a pneumatic tire, an air agitation portion formed by an interruption in the sound-absorbing member is disposed in at least one location on the tire circumference.

14 Claims, 4 Drawing Sheets

(51) Int. Cl.
 *B60C 13/00* (2006.01)
 *B60C 15/00* (2006.01)
 *B60C 11/00* (2006.01)
 *B60C 1/00* (2006.01)

(52) U.S. Cl.
 CPC .............. *B60C 15/00* (2013.01); *B60C 23/04* (2013.01); *B60C 23/0493* (2013.01)

(58) Field of Classification Search
 USPC ........................................ 152/153, 450, 564
 See application file for complete search history.

(56) References Cited

U.S. PATENT DOCUMENTS

| | | | |
|---|---|---|---|
| 2005/0205183 A1* | 9/2005 | Yukawa | B60C 19/002 |
| | | | 152/450 |
| 2005/0273218 A1* | 12/2005 | Breed | B60C 11/24 |
| | | | 701/2 |
| 2007/0146124 A1 | 6/2007 | Shinmura | |
| 2009/0090446 A1 | 4/2009 | Ikeda et al. | |
| 2009/0277551 A1* | 11/2009 | Yukawa | B60C 19/002 |
| | | | 152/450 |
| 2011/0041977 A1* | 2/2011 | Shepler | B60C 19/002 |
| | | | 152/564 |

FOREIGN PATENT DOCUMENTS

| | | |
|---|---|---|
| JP | 2005-138760 | 6/2005 |
| JP | 2007-176403 | 7/2007 |
| JP | 2007-237962 | 9/2007 |
| WO | WO 2003/103989 | 12/2003 |
| WO | WO 2007/102279 | 9/2007 |

* cited by examiner

US 10,286,737 B2

PNEUMATIC TIRE

TECHNICAL FIELD

The present technology relates to a pneumatic tire in which a belt-shaped sound-absorbing member is bonded to a region on a tire inner surface corresponding to a tread portion, and particularly relates to a pneumatic tire that can suppress a separation of the sound-absorbing member that is caused by heat generation in the sound-absorbing member and an adhesive layer thereof.

BACKGROUND ART

In pneumatic tires, cavity resonance caused by the vibration of air with which the tire is inflated is one cause of noise generation. When a tire is rolled, uneven road surfaces cause a tread portion to vibrate. The vibrations of the tread portion cause the air inside the tire to vibrate, which generates the cavity resonance.

In order to reduce noise caused by this cavity resonance, a configuration has been proposed wherein a sound-absorbing member is disposed inside a space formed between a tire and the rim of a wheel. More specifically, a belt-shaped sound-absorbing member is bonded to a region on the tire inner surface corresponding to the tread portion (see Japanese Unexamined Patent Application Publication Nos. 2002-67608A and 2005-138760A, for example).

However, when the belt-shaped sound-absorbing member is bonded to the region on the tire inner surface corresponding to the tread portion, heat is generated in the sound-absorbing member and the adhesive layer thereof when the pneumatic tire travels. As a result, softening or degradation occurs in the adhesive layer provided to fix the sound-absorbing member. Then, when the softening or the degradation occurs in the adhesive layer, there arises a problem in which the sound-absorbing member tends to be easily separated from the tire inner surface.

SUMMARY

The present technology provides a pneumatic tire capable of suppressing a separation of a sound-absorbing member that is caused by heat generation in the sound-absorbing member and an adhesive layer thereof.

A pneumatic tire of the present technology includes an annular-shaped tread portion extending in a tire circumferential direction; a pair of sidewall portions disposed on both sides of the tread portion; a pair of bead portions disposed on inner sides of the sidewall portions in a tire radial direction; and a belt-shaped sound-absorbing member bonded to a region on a tire inner surface corresponding to the tread portion along the tire circumferential direction with an adhesive layer disposed between the tire inner surface and the sound-absorbing member. In such a pneumatic tire, an air agitation portion formed by an interruption in the sound-absorbing member is disposed in at least one location on a tire circumference.

According to the present technology, in the pneumatic tire in which the belt-shaped sound-absorbing member is bonded to the region on the tire inner surface corresponding to the tread portion along the tire circumferential direction with the adhesive layer disposed between the tire inner surface and the sound-absorbing member, the air agitation portion formed by the interruption in the sound-absorbing member is provided in at least one location on the tire circumference. The air agitation portion functions so as to agitate the air inside a space when the pneumatic tire is rotated. Thus, even when heat is generated in the sound-absorbing member and the adhesive layer thereof as the pneumatic tire travels, it is possible to inhibit softening or degradation from occurring in the adhesive layer provided to fix the sound-absorbing member, by diffusing the heat over the entire air inside the space. As a result, it is possible to suppress a separation of the sound-absorbing member caused by the heat generation in the sound-absorbing member and the adhesive layer thereof.

In the present technology, it is preferable that the air agitation portion be provided in a plurality of locations on the tire circumference, and it is particularly preferable that the air agitation portion be provided in three to five locations on the tire circumference. Accordingly, it is possible to efficiently obtain a heat diffusion effect produced by the air agitation portion.

It is preferable that the length of the air agitation portion in the tire circumferential direction be in a range of from 0.5 to 10 times the height of the sound-absorbing member. Accordingly, it is possible to efficiently obtain the heat diffusion effect produced by the air agitation portion. When the air agitation portion is provided in the plurality of locations on the tire circumference, it is preferable that the air agitation portions have different lengths from each other in the tire circumferential direction. Because the optimum length of the air agitation portion in the tire circumferential direction to produce the heat diffusion effect varies depending on the rotation speed of the tire, by causing the lengths of the plurality of air agitation portions to be different from each other in the tire circumferential direction, it is possible to obtain an excellent heat diffusion effect at various rotation speeds.

It is preferable that the sound-absorbing member be a single sound-absorbing member extending in the tire circumferential direction, that the sound-absorbing member have a uniform thickness at least over a range corresponding to an adhesive surface along a cross section orthogonal to a longitudinal direction of the sound-absorbing member, and that a shape of the cross section be constant in the longitudinal direction. Accordingly, it is possible to maximize the volume of the sound-absorbing member per adhering area and to achieve an excellent noise reduction effect. Further, because it is easy to process the sound-absorbing member having the above-described shape, manufacturing costs are also low.

It is preferable that a ratio of the volume of the sound-absorbing member with respect to the volume of the space formed inside the tire when the tire is assembled to the rim be larger than 20%. The sound-absorbing member having such a large volume makes it possible to achieve an excellent noise reduction effect. Moreover, it is possible to maintain a good adhesive state for a long period of time, even when the sound-absorbing member is large. The volume of the space is a volume of the space formed between the tire and the rim, with the tire assembled to a regular rim and inflated to a regular inner pressure. "Regular rim" is a rim defined by a standard for each tire according to a system of standards that includes the standards on which the tires are based, and refers to a "standard rim" in the case of JATMA (Japan Automobile Tyre Manufacturers Association, Inc.), refers to a "design rim" in the case of TRA (the Tire and Rim Association), and refers to a "measuring rim" in the case of ETRTO (European Tyre and Rim Technical Organisation). However, when the tire is to be mounted to a new vehicle, the volume of the space is calculated using a genuine wheel to which the tire is assembled. "Regular inner pressure" is the air pressure defined by a standard for each tire according to a system of standards that includes the standards on which the tires are based, and refers to a "maximum air pressure" in the case of JATMA, refers to the maximum value in the table of "TIRE ROAD LIMITS AT VARIOUS COLD INFLATION PRESSURES" in the case of TRA, and refers to the "inflation pressure" in the case of ETRTO. However, when the tire is to be mounted to a new vehicle, the air pressure displayed on the vehicle is used.

It is preferable that hardness of the sound-absorbing member be from 60 N to 170 N, and tensile strength of the sound-absorbing member be from 60 kPa to 180 kPa. The sound-absorbing member that has the above-described physical properties has excellent durability with respect to shearing strain, which arises from expansion due to inflation of the tire or a deformation of the tread portion that occurs when the tire comes into contact with the ground. The hardness of the sound-absorbing member is measured according to Japanese Industrial Standard JIS-K6400-2 "Flexible cellular polymeric materials—Physical properties—Part 2: Determination of hardness and stress-strain characteristics in compression", and is measured based on the method D thereof (a method for calculating the force obtained in 20 seconds after starting to apply a constant compression of 25%). Further, the tensile strength of the sound-absorbing member is measured according to JIS-K6400-5 "Flexible cellular polymeric materials—Physical properties—Part 5: Determination of tensile strength, elongation at break and tear strength".

It is preferable that the adhesive layer be formed by a double-sided tape, and a peeling adhesive strength of the adhesive layer be set in a range from 8 N/20 mm to 40 N/20 mm. Accordingly, while maintaining a good fixing strength of the sound-absorbing member, it is possible to easily bond the sound-absorbing member and disassemble the tire at a time of disposing of the tire. The peeling adhesive strength of the double-sided tape is measured according to JIS-Z0237. More specifically, a double-sided adhesive sheet is backed with a PET film having a thickness of 25 μm. The backed adhesive sheet is cut into a rectangular shape of 20 mm×200 mm so as to create a test piece. A release liner is removed from the test piece, and an exposed adhering surface is attached to a stainless steel (SUS:B304, surface finishing BA) plate (adherend) by moving a roller of 2 kg back and forth once over the test piece. After keeping the test piece in an environment of 23° C. and RH 50% for 30 minutes, a 180 degrees peeling adhesive strength with respect to the SUS plate is measured according to JIS-Z0237, using a tensile tester in an environment of 23° C. and RH 50% and under conditions in which the peeling angle is set to 180 degrees and the tensile speed is set to 300 mm/minute.

It is preferable that an electronic device be installed in the air agitation portion. Specifically, because the sound-absorbing member does not exist in the air agitation portion, it is possible to correct a mass unbalance by installing the electronic device in the air agitation portion. Moreover, as a result of the air being agitated, it is possible to obtain an effect of cooling the electronic device.

DETAILED DESCRIPTION

Figure 1:
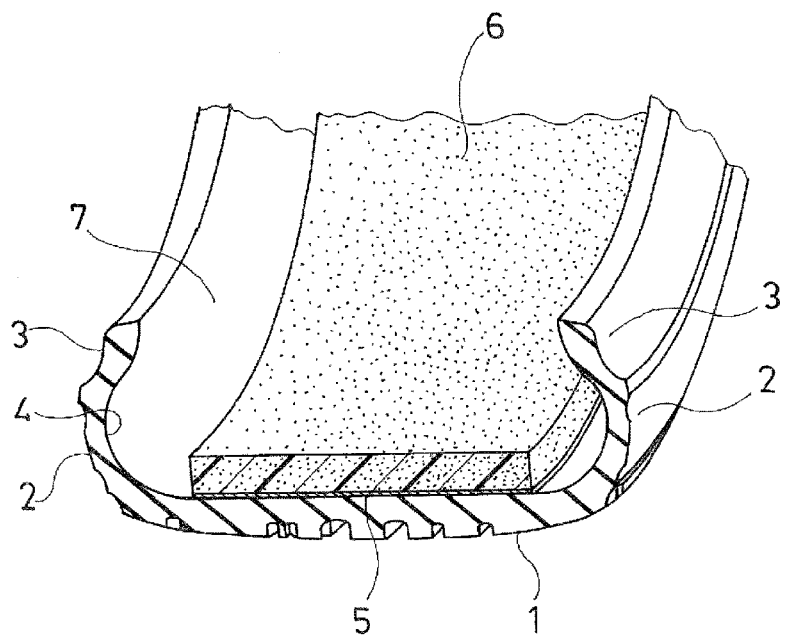
FIG. 1 is a perspective view of a pneumatic tire according to an embodiment of the present technology.
Figure 2:
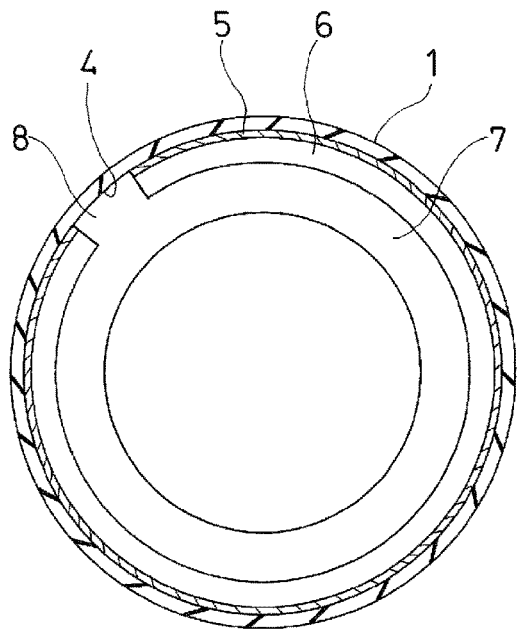
FIG. 2 is a cross-sectional view along the equatorial line of the pneumatic tire according to the embodiment of the present technology.

A configuration of the present technology will be described below in detail with reference to the accompanying drawings. FIGS. 1 and 2 illustrate a pneumatic tire according to an embodiment of the present technology. As illustrated in FIG. 1, a pneumatic tire of this embodiment is provided with an annular-shaped tread portion 1 extending in the tire circumferential direction, a pair of sidewall portions 2 disposed on both sides of the tread portion 1, and a pair of bead portions 3 disposed on inner sides of the sidewall portions 2 in the tire radial direction.

In the above-described pneumatic tire, a belt-shaped sound-absorbing member 6 is bonded to a region on a tire inner surface 4 corresponding to the tread portion 1 along the tire circumferential direction with an adhesive layer 5 disposed between the tire inner surface 4 and the sound-absorbing member 6. The sound-absorbing member 6 is formed of a porous material having open cells and has predetermined noise absorbing characteristics based on the porous structure thereof. Urethane foam is preferably used as the porous material of the sound-absorbing member 6. Meanwhile, as the adhesive layer 5, a paste adhesive or a double-sided adhesive tape can be used.

Figure 3:
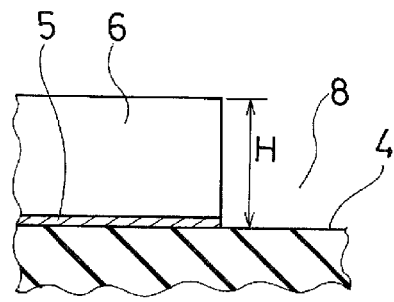
FIG. 3 is an enlarged side view of an end portion of a sound-absorbing member bonded to an inner surface of the pneumatic tire of the present technology.

Further, in a space 7 of the pneumatic tire, an air agitation portion 8 is formed by an interruption in the sound-absorbing member 6 in at least one location on the tire circumference. Because this air agitation portion 8 is intended to agitate the air inside the space 7, areas of end surfaces of the sound-absorbing member 6 facing the air agitation portion 8 are set to be as large as possible. As illustrated in FIG. 3, the end surface of the sound-absorbing member 6 facing the air agitation portion 8 is preferably formed to be perpendicular to the tire inner surface 4.

Figure 4:
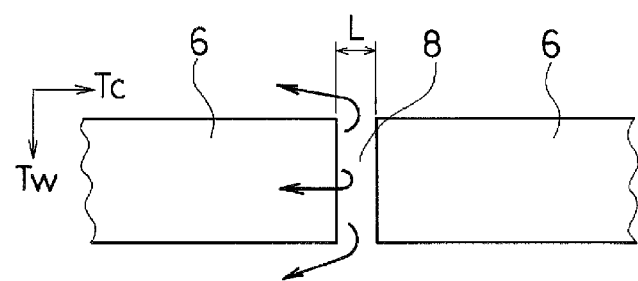
FIG. 4 is an enlarged plan view of the sound-absorbing member bonded to the inner surface of the pneumatic tire of the present technology and an air agitation portion.
Figure 5:
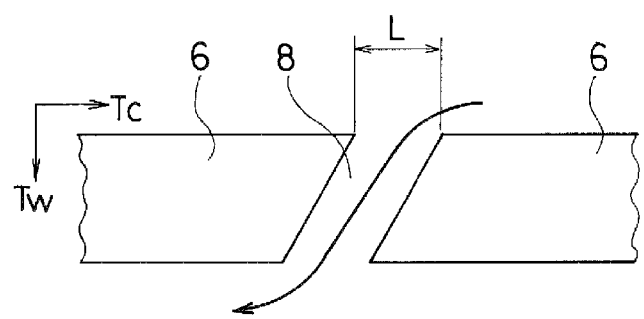
FIG. 5 is an enlarged side view of a modified example of the sound-absorbing member bonded to the inner surface of the pneumatic tire of the present technology and the air agitation portion.
Figure 6:
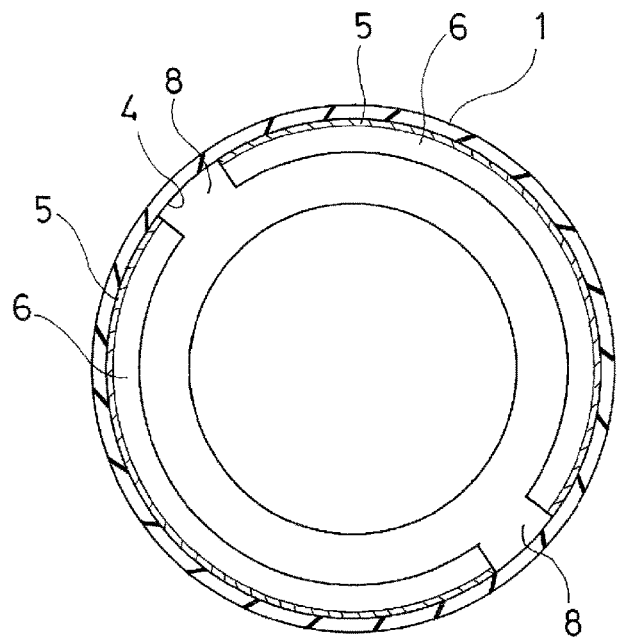
FIG. 6 is a cross-sectional view along the equatorial line of the pneumatic tire according to another embodiment of the present technology.

FIGS. 4 and 5 illustrate the sound-absorbing member 6 bonded to the inner surface of the pneumatic tire of the present technology and the air agitation portion 8. In FIGS. 4 and 5, Tc denotes the tire circumferential direction, and Tw denotes the tire width direction. In FIG. 4, the air agitation portion 8 extends in the tire width direction Tw so as to be orthogonal to the tire circumferential direction Tc. The air agitation portion 8 is formed in a rectangular shape in a plan view. In this case, the end surface of the sound-absorbing member 6 functions so as to agitate the air inside the space 7. As a result, it is possible to achieve an excellent agitation effect (see the arrows in FIG. 4). Meanwhile, in FIG. 5, the air agitation portion 8 extends in the tire width direction Tw while being inclined with respect to the tire circumferential direction Tc. The air agitation portion 8 is formed in a parallelogram in a plan view. In this case, the end surface of the sound-absorbing member 6 provides a flow for the air inside the space 7 in the direction inclined with respect to the tire circumferential direction Tc. As a result, it is possible to achieve an excellent agitation effect (see the arrow in FIG. 5).

In the above-described pneumatic tire, when the belt-shaped sound-absorbing member 6 is bonded to the region on the tire inner surface corresponding to the tread portion 1 along the tire circumferential direction with the adhesive layer 5 disposed between the tire inner surface and the sound-absorbing member 6, the air agitation portion 8 formed by the interruption in the sound-absorbing member 6 is provided in at least one location on the tire circumference. The air agitation portion 8 functions so as to agitate the air inside the space 7 when the pneumatic tire is rotated. Thus, even when heat is generated in the sound-absorbing member 6 and the adhesive layer 5 thereof when the pneumatic tire travels, the heat is diffused throughout the entire air inside the space 7, and the heat can be also diffused into the rim of a wheel. Accordingly, it is possible to inhibit softening or degradation from occurring in the adhesive layer 5 provided to fix the sound-absorbing member 6. As a result, it is possible to suppress a separation of the sound-absorbing member 6 that is caused by the heat generation in the sound-absorbing member 6 and the adhesive layer 5 thereof.

Although it is necessary to provide the air agitation portion 8 in at least one location on the tire circumference, the agitation portion 8 may be provided in a plurality of locations on the tire circumference. In particular, the air agitation portion 8 is preferably provided in three to five locations on the tire circumference. Accordingly, it is possible to efficiently obtain the heat diffusion effect produced by the air agitation portions 8. When the number of the air agitation portions 8 provided on the tire circumference is two or less, the heat diffusion effect cannot be optimized. On the other hand, when the number of the air agitation portions 8 is six or more, the heat diffusion effect reaches saturation, and this only results in an increase in manufacturing costs. In addition, from a perspective of the tire uniformity, it is preferable to make the number of the air agitation portions 8 provided on the tire circumference an odd number. When the air agitation portion 8 is provided in the plurality of locations on the tire circumference, it is preferable that those air agitation portions 8 be arranged at equal intervals in the tire circumferential direction.

FIGS. 6 to 9 illustrate the pneumatic tires according to other embodiments of the present technology. Although the air agitation portion 8 is provided in one location on the tire circumference in the embodiment illustrated in FIG. 2, the air agitation portion 8 is provided in two locations on the tire circumference in the embodiment illustrated in FIG. 6, the air agitation portion 8 is provided in three locations on the tire circumference in the embodiment illustrated in FIG. 7, and the air agitation portion 8 is provided in four locations on the tire circumference in the embodiment illustrated in FIG. 8.

Figure 9:
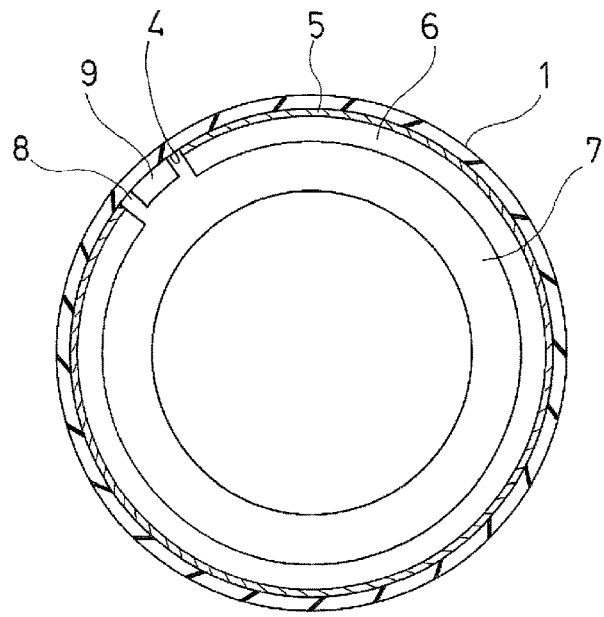
FIG. 9 is a cross-sectional view along the equatorial line of the pneumatic tire according to yet another embodiment of the present technology.

In the embodiment illustrated in FIG. 9, the air agitation portion 8 is provided in one location on the tire circumference, but in this case, an electronic device 9 is installed in the air agitation portion 8. This electronic device 9 is bonded to the tire inner surface 4 by an adhesive and the like in the air agitation portion 8. The electronic device 9 includes a tire air pressure monitoring system (TPMS) for detecting a tire air pressure, for example. Because the sound-absorbing member 6 does not exist in the air agitation portion 8, by installing the electronic device 9 in the air agitation portion 8, it is possible to correct a mass unbalance. Further, because the air is diffused in the air agitation portion 8, it is possible to efficiently cool the electronic device 9 disposed in the air agitation portion 8.

In the above-described various embodiments, it is preferable that a length L of the air agitation portion 8 in the tire circumferential direction be in a range of from 0.5 to 10 times a height H, which is a height of the sound-absorbing member 6 from the inner surface 4 (see FIGS. 3 to 5). Accordingly, it is possible to efficiently obtain the heat diffusion effect produced by the air agitation portion 8. Here, when the length L of the air agitation portion 8 in the tire circumferential direction is less than 0.5 times the height H of the sound-absorbing member 6, the heat diffusion effect diminishes. On the other hand, when the length L of the air agitation portion 8 in the tire circumferential direction is more than ten times the height H, the noise absorption effect diminishes because the length of the sound-absorbing member 6 is reduced. In particular, the length L of the air agitation portion 8 in the tire circumferential direction is preferably in a range of from one to five times (most preferably from 1.2 to 3 times) the height H of the sound-absorbing member 6. Note that the length L of the air agitation portion 8 in the tire circumferential direction is a length measured along the tire inner surface 4.

When the air agitation portion 8 is provided in a plurality of locations on the tire circumference, it is preferable that the lengths L of the air agitation portions 8 be different from each other in the tire circumferential direction. The optimum length L of the air agitation portion 8 in the tire circumferential direction to produce the heat diffusion effect depends on a rotation speed of the tire. For example, when the tire rotates at a high speed, an excellent heat diffusion effect cannot be obtained, unless the length L in the tire circumferential direction is sufficiently large. However, when the tire rotates at a low speed, a sufficient heat diffusion effect can be obtained even when the length L in the tire circumferential direction is small. Thus, by causing the lengths L of the plurality of air agitation portions 8 to be different from each other in the tire circumferential direction, it is possible to obtain an excellent heat diffusion effect at various rotation speeds.

In the above-described pneumatic tire, it is preferable that the sound-absorbing member 6 be formed by one sound-absorbing member 6 extending in the tire circumferential direction, that the sound-absorbing member 6 have a uniform thickness at least over a range corresponding to the adhesive surface along a cross-section orthogonal to the longitudinal direction of the sound-absorbing member 6, and that the shape of the cross section be constant in the longitudinal direction. In particular, although it is preferable that the cross-sectional shape of the cross section orthogonal to the longitudinal direction of the sound-absorbing member 6 be rectangular (including a square), in some cases, the shape may be an inverted trapezoid shape that becomes narrower on the adhesive surface side. Accordingly, it is possible to maximize the volume of the sound-absorbing member 6 per adhering area and to obtain an excellent noise reduction effect. Further, because it is easy to process the sound-absorbing member 6 having the above-described shape, manufacturing costs are also low.

When the above-described pneumatic tire is assembled to the rim, the space 7 is formed between the tire inner surface 4 and the rim. A ratio of the volume of the sound-absorbing member 6 with respect to the volume of the space 7 is preferably greater than 20%. Such a larger volume of the sound-absorbing member 6 makes it possible to achieve an excellent noise reduction effect. Moreover, it is possible to maintain a good adhesive state for a long period of time, even when the sound-absorbing member is large. Note that the width of the sound-absorbing member 6 is preferably in a range of from 30% to 90% of a ground contact width of the tire.

The hardness (JIS-K6400-2) of the sound-absorbing member 6 is preferably from 60 N to 170 N, and the tensile strength (JIS-K6400-5) of the sound-absorbing member 6 is preferably from 60 kPa to 180 kPa. The sound-absorbing member 6 that has the above-described physical properties has excellent durability with respect to shearing strain. When the hardness or the tensile strength of the sound-absorbing member 6 is too small, this results in a deterioration in durability of the sound-absorbing member 6. In particular, the hardness of the sound-absorbing member 6 is preferably from 70 N to 160 N, and more preferably from 80 N to 140 N. Further, the tensile strength of the sound-absorbing member 6 is preferably from 75 kPa to 165 kPa, and more preferably from 90 kPa to 150 kPa.

A peeling adhesive strength (JIS-Z0237:2009) of the adhesive layer 5 is preferably in a range of from 8 N/20 mm to 40 N/20 mm. Accordingly, while maintaining a good fixing strength of the sound-absorbing member 6, it is possible to easily bond the sound-absorbing member 6 and disassemble the tire at a time of disposing of the tire. More specifically, when a peeling force of the adhesive layer 5 is too weak, a fixed state of the sound-absorbing member 6 becomes unstable, and on the other hand, when the peeling force of the adhesive layer 5 is too strong, it becomes difficult to change the position of the sound-absorbing member 6 during the bonding process of the sound-absorbing member 6, and also difficult to peel off the sound-absorbing member 6 at the time of disposing of the tire. In particular, the peeling adhesive strength of the adhesive layer 5 is preferably from 9 N/20 mm to 30 N/20 mm, and more preferably from 10 N/20 mm to 25 N/20 mm.

EXAMPLES

With respect to a pneumatic tire of a tire size 215/45R17, which is provided with an annular-shaped tread portion extending in the tire circumferential direction, a pair of sidewall portions disposed on both sides of the tread portion, a pair of bead portions disposed on inner sides of the sidewall portions in the tire radial direction, and a belt-shaped sound-absorbing member bonded to a region on the tire inner surface corresponding to the tread portion along the tire circumferential direction with an adhesive layer disposed between the tire inner surface and the sound-absorbing member, tires according to Comparative Example 1 and Working Examples 1 to 4 were manufactured in which the configurations of the sound-absorbing members are different from each other.

In Comparative Example 1, the belt-shaped sound-absorbing member was arranged on the whole tire circumference without providing any air agitation portion.

In Working Example 1, the air agitation portion, which was formed by an interruption in the sound-absorbing member, was provided in one location on the tire circumference, as illustrated in FIG. 2. The length L of the air agitation portion in the tire circumferential direction was three times the height H of the sound-absorbing member. Further, the shape of the air agitation portion in a plan view was a rectangular shape, as illustrated in FIG. 4.

Figure 7:
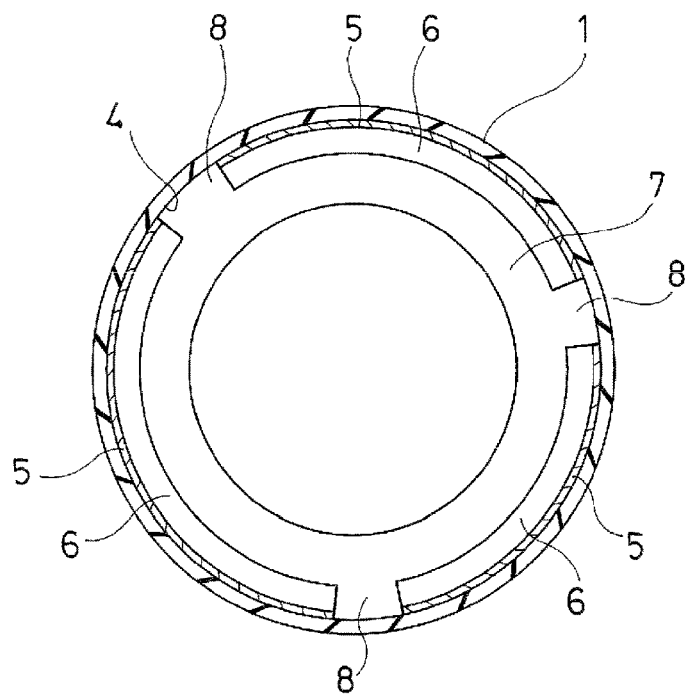
FIG. 7 is a cross-sectional view along the equatorial line of the pneumatic tire according to yet another embodiment of the present technology.
Figure 8:
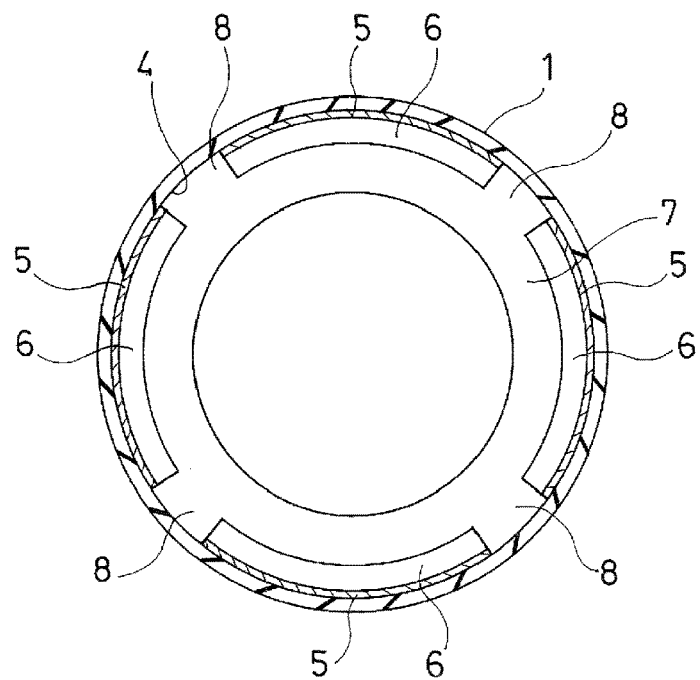
FIG. 8 is a cross-sectional view along the equatorial line of the pneumatic tire according to yet another embodiment of the present technology.

In Working Example 2, the air agitation portions, which were formed by interruptions in the sound-absorbing member, were provided in three locations on the tire circumference, as illustrated in FIG. 7. Each of the lengths L of the air agitation portions in the tire circumferential direction was three times the height H of the sound-absorbing member. Further, the shape of each of the air agitation portions in a plan view was a rectangular shape, as illustrated in FIG. 4.

In Working Example 3, the air agitation portions, which were formed by interruptions in the sound-absorbing member, were provided in three locations on the tire circumference, as illustrated in FIG. 7. The lengths L of the air agitation portions in the tire circumferential direction were respectively three times, four times, and five times the height H of the sound-absorbing member, so that the lengths L in the tire circumferential direction became different from each other. Further, the shape of each of the air agitation portions in a plan view was a rectangular shape, as illustrated in FIG. 4.

In Working Example 4, the air agitation portions, which were formed by interruptions in the sound-absorbing member, were provided in three locations on the tire circumference, as illustrated in FIG. 7. Each of the lengths L of the air agitation portions in the tire circumferential direction was three times the height H of the sound-absorbing member. Further, the shape of each of the air agitation portions in a plan view was a parallelogram, as illustrated in FIG. 5.

In Comparative Example 1 and Working Examples 1 to 4, the following items were made common. The cross-sectional shape of the cross-section orthogonal to the longitudinal direction of the sound-absorbing member was rectangular, and the cross-sectional shape was made constant in the tire circumferential direction. The ratio of the volume of the sound-absorbing member with respect to the volume of the space formed inside the tire when the tire is assembled to the rim, was 30%. The hardness of the sound-absorbing member was 80 N, and the tensile strength of the sound-absorbing member was 90 kPa. The peeling adhesive strength of the adhesive layer was 16 N/20 mm.

Each of the pneumatic tires according to Comparative Example 1 and Working Examples 1 to 4 was assembled to a wheel having a rim size of 17×7JJ. Then, the pneumatic tire underwent a 100-hour traveling test on a drum test machine under conditions in which the air pressure was 150 kPa, the load was 5 kN, and the speed was 150 km/h. After that, the pneumatic tire was visually checked for the adhesive peeling-off of the sound-absorbing member. In addition, as an indicator of the adhesive peeling-off resistance, the traveling test was carried out on the drum test machine under the same conditions as described above, and a travel distance up to when the adhesive peeling-off occurred was recorded while checking for the adhesive peeling-off of the sound-absorbing member every 10 hours. Evaluation results were expressed as index values, Comparative Example 1 being assigned a reference value of 100. A larger index value indicates superior adhesive peeling-off resistance. The results are shown in Table 1.

TABLE 1

|  | Comparative Example 1 | Working Example 1 | Working Example 2 | Working Example 3 | Working Example 4 |
|---|---|---|---|---|---|
| Presence of air agitation portion | Absence | Presence | Presence | Presence | Presence |
| Arrangement of air agitation portions in circumferential direction | — | FIG. 2 | FIG. 7 | FIG. 7 | FIG. 7 |
| Shape of air agitation portion in plan view | — | FIG. 4 | FIG. 4 | FIG. 4 | FIG. 5 |
| Length 1 of air agitation portion (multiplication ratio with respect to height h of sound-absorbing member) | — | 3-Times | 3-Times | 3, 4, 5-Times | 3-Times |
| Presence of adhesive peeling-off of sound-absorbing member | Presence | Absence | Absence | Absence | Absence |
| Adhesive peeling-off resistance | 100 | 110 | 120 | 140 | 120 |

As shown in Table 1, the adhesive peeling-off of the sound-absorbing member notably occurred in the tire of Comparative Example 1. However, in Working Examples 1 to 4, the adhesive peeling-off of the sound-absorbing member was not observed at all.

Next, tires according to Working Examples 5 to 12 were prepared, each of which had the same structure as that of Working Example 2, except the hardness of the sound-absorbing member, the tensile strength of the sound-absorbing member, the peeling adhesive strength of the adhesive layer, and the length L of the air agitation portion in the tire circumferential direction.

With respect to those Working Examples 5 to 12, after carrying out the 100-hour traveling test, the presence of the adhesive peeling-off and the adhesive peeling-off resistance were evaluated by the same method described above. The results are shown in Table 2.

TABLE 2

|  | Working Example 5 | Working Example 6 | Working Example 7 | Working Example 8 |
|---|---|---|---|---|
| Presence of air agitation portion | Presence | Presence | Presence | Presence |
| Arrangement of air agitation portions in circumferential direction | FIG. 7 | FIG. 7 | FIG. 7 | FIG. 7 |
| Shape of air agitation portion in plan view | FIG. 4 | FIG. 4 | FIG. 4 | FIG. 4 |
| Length 1 of air agitation portion (multiplication ratio with respect to height h of sound-absorbing member) | 3-times | 3-times | 3-times | 3-times |
| Hardness of sound-absorbing member (n) | 60 | 170 | 80 | 80 |
| Tensile strength of sound-absorbing member (kPa) | 60 | 180 | 90 | 90 |
| Peeling adhesive strength of adhesive layer (N/20 mm) | 16 | 16 | 8 | 40 |
| Presence of adhesive peeling-off of sound-absorbing member | Absence | Absence | Absence | Absence |
| Adhesive peeling-off resistance capability | 120 | 120 | 110 | 140 |

|  | Working Example 9 | Working Example 10 | Working Example 11 | Working Example 12 |
|---|---|---|---|---|
| Presence of air agitation portion | Presence | Presence | Presence | Presence |
| Arrangement of air agitation portions in circumferential direction | FIG. 7 | FIG. 7 | FIG. 7 | FIG. 7 |
| Shape of air agitation portion in plan view | FIG. 4 | FIG. 4 | FIG. 4 | FIG. 4 |
| Length 1 of air agitation portion (multiplication ratio with respect to height h of sound-absorbing member) | 0.5-times | 1-times | 5-times | 10-times |

TABLE 2-continued

| | | | | |
|---|---|---|---|---|
| Hardness of sound-absorbing member (n) | 80 | 80 | 80 | 80 |
| Tensile strength of sound-absorbing member (kPa) | 90 | 90 | 90 | 90 |
| Peeling adhesive strength of adhesive layer (N/20 mm) | 16 | 16 | 16 | 16 |
| Presence of adhesive peeling-off of sound-absorbing member | Absence | Absence | Absence | Absence |
| Adhesive peeling-off resistance capability | 110 | 115 | 115 | 110 |

As shown in Table 2, in Working Examples 5 to 8, in which the hardness of the sound-absorbing member, the tensile strength of the sound-absorbing member, and the peeling adhesive strength of the adhesive layer were set differently for each of the tires, similarly to Working Example 2, the adhesive peeling-off of the sound-absorbing member was not observed at all after carrying out the 100-hour traveling test. In addition, as is apparent from the comparison between the Working Example 2 and Working Examples 9 to 12, it is understood that it is possible to efficiently improve the adhesive peeling-off resistance by appropriately adjusting the length L of the air agitation portion in the tire circumferential direction.

The invention claimed is:

1. A pneumatic tire comprising:
an annular-shaped tread portion extending in a tire circumferential direction;
a pair of sidewall portions disposed on both sides of the tread portion;
a pair of bead portions disposed on inner sides of the sidewall portions in a tire radial direction; and
a belt-shaped sound-absorbing member bonded to a region on a tire inner surface corresponding to the tread portion along the tire circumferential direction with an adhesive layer disposed between the tire inner surface and the sound-absorbing member, wherein
air agitation portions formed by an interruption in the sound-absorbing member is disposed in a plurality of locations on a tire circumference, wherein the air agitation portions have different lengths from each other in the tire circumferential direction and an electronic device is installed in one of the air agitation portions; and
the sound-absorbing member extends in the tire circumferential direction, the sound-absorbing member having an uniform thickness at least over a range corresponding to an adhering surface along a cross section orthogonal to a longitudinal direction of the sound-absorbing member, and a shape of the cross section is constant in the longitudinal direction.

2. The pneumatic tire according to claim 1, wherein the air agitation portions are provided in three to five locations on the tire circumference.

3. The pneumatic tire according to claim 1, wherein the length of the air agitation portions in the tire circumferential direction is in a range of from 0.5 to 10 times a height of the sound-absorbing member.

4. The pneumatic tire according to claim 1, wherein a ratio of a volume of the sound-absorbing member with respect to a volume of a space formed inside the tire when the tire is assembled to a rim is larger than 20%.

5. The pneumatic tire according to claim 1, wherein hardness of the sound-absorbing member is from 60 N to 170 N, and tensile strength of the sound-absorbing member is from 60 kPa to 180 kPa.

6. The pneumatic tire according to claim 1, wherein the adhesive layer is formed by a double-sided tape, and peeling adhesive strength of the adhesive layer is in a range of from 8 N/20 mm to 40 N/20 mm.

7. The pneumatic tire according to claim 1, wherein the sound-absorbing member is formed of a porous material having open cells.

8. The pneumatic tire according to claim 7, wherein the porous material is urethane foam.

9. The pneumatic tire according to claim 2, wherein the length of the air agitation portions in the tire circumferential direction is in a range of from 0.5 to 10 times a height of the sound-absorbing member.

10. The pneumatic tire according to claim 9, wherein a ratio of a volume of the sound-absorbing member with respect to a volume of a space formed inside the tire when the tire is assembled to a rim is larger than 20%.

11. The pneumatic tire according to claim 10, wherein hardness of the sound-absorbing member is from 60 N to 170 N, and tensile strength of the sound-absorbing member is from 60 kPa to 180 kPa.

12. The pneumatic tire according to claim 11, wherein the adhesive layer is formed by a double-sided tape, and peeling adhesive strength of the adhesive layer is in a range of from 8 N/20 mm to 40 N/20 mm.

13. The pneumatic tire according to claim 12, wherein the sound-absorbing member is formed of urethane foam having open cells.

14. A pneumatic tire comprising:
an annular-shaped tread portion extending in a tire circumferential direction;
a pair of sidewall portions disposed on both sides of the tread portion;
a pair of bead portions disposed on inner sides of the sidewall portions in a tire radial direction; and
a belt-shaped sound-absorbing member bonded to a region on a tire inner surface corresponding to the tread portion along the tire circumferential direction with an adhesive layer disposed between the tire inner surface and the sound-absorbing member, wherein
air agitation portions formed by an interruption in the sound-absorbing member are provided in a plurality of locations on the tire circumference, the air agitation portions having different lengths from each other in the tire circumferential direction.

* * * * *